No. 771,986. PATENTED OCT. 11, 1904.
B. KNIFFLER.
MEANS FOR DISSOLVING SIZE FOR PAPER MAKING.
APPLICATION FILED MAR. 25, 1904.
NO MODEL.
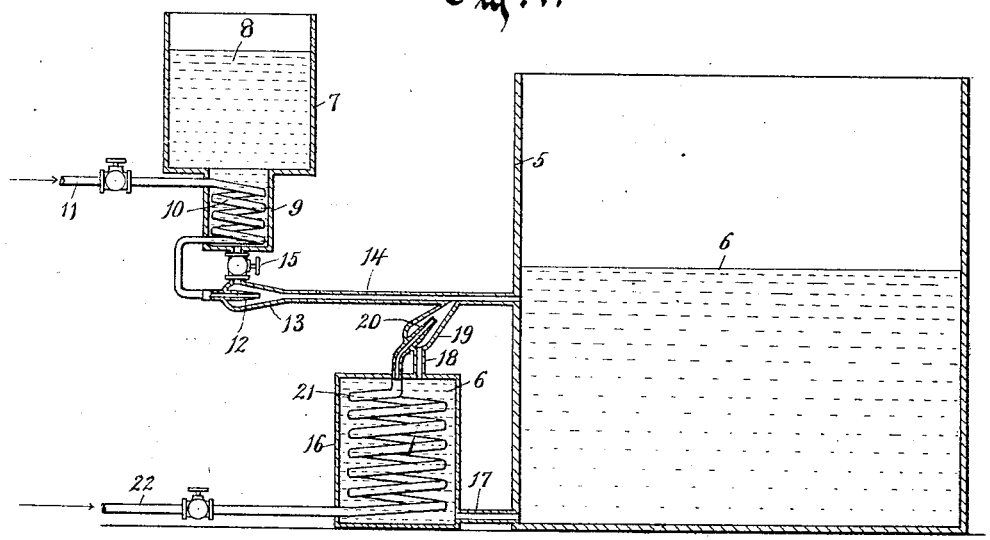
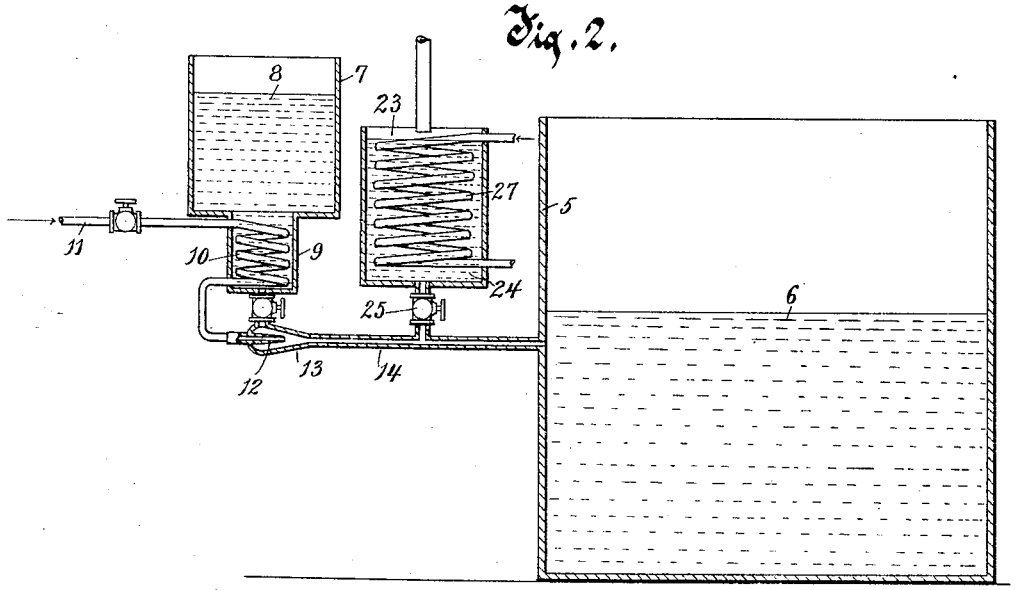
WITNESSES:
Anna F. Schmidtbauer
R. S. C. Caldwell.
INVENTOR
Bruno Kniffler
BY
Benedict & Morsell
ATTORNEYS.

No. 771,986.

Patented October 11, 1904.

UNITED STATES PATENT OFFICE.

BRUNO KNIFFLER, OF MILWAUKEE, WISCONSIN.

MEANS FOR DISSOLVING SIZE FOR PAPER-MAKING.

SPECIFICATION forming part of Letters Patent No. 771,986, dated October 11, 1904.

Application filed March 25, 1904. Serial No. 199,963. (No model.)

*To all whom it may concern:*

Be it known that I, BRUNO KNIFFLER, residing in Milwaukee, in the county of Milwaukee and State of Wisconsin, have invented new and useful Improvements in Means for Dissolving Size for Paper-Making, of which the following is a description, reference being had to the accompanying drawings, which are a part of this specification.

This invention relates to certain new and useful improvements in means for dissolving size for paper-making, and has for its object to provide for mixing paper-size with water without the necessity for heating the entire body of water with which the size is to be mixed or of heating the entire body of size at one time.

In my copending application filed February 5, 1904, and bearing Serial No. 192,090 I have shown and described an apparatus for mixing size with water, of which the present invention constitutes an improvement.

It has been found that in making size solution in very large quantities it is sometimes impractical to heat the great body of water with which the size is to be mixed to the necessary temperature for the perfect operation of mixing the size therewith, and, too, it is sometimes found impractical to heat at one time the entire quantity of size which will be necessary to be used with the process on the enlarged scale. Therefore I have found it advisable to provide for heating only small portions of the water and of the size and thoroughly mixing such heated portions in the injector just before they are injected forcibly into the water of the main vessel, for which there need be no provision for heating.

With the above and other objects in view the invention consists in the devices and parts and their equivalents, as hereinafter set forth.

Referring to the accompanying drawings, in which like characters of reference indicate similar parts in the different views, Figure 1 is a vertical sectional view of an apparatus embodying this invention, and Fig. 2 is a similar view of a modification thereof.

In the drawings, 5 represents a vessel containing water 6, and 7 is a smaller vessel containing size 8, which latter vessel is provided at its bottom with a contracted portion 9, in which is located a steam-coil 10, fed from a valved steam-supply pipe 11. The end of the steam-coil 10 passes out of the contracted portion of the vessel 7 and connects with the nozzle 12 of a steam-injector 13, which connects by a pipe 14 with the vessel 5 and is adapted to discharge just beneath the level of the water 6 in said vessel 5. A valved connection 15 connects the bottom of the reduced portion 9 of size vessel 7 to the casing of the injector 13, so that the passage of steam through the nozzle 12 will draw hot size through said connection from the chamber 9 and forcibly disintegrate it and inject it through the pipe 14 into the water 6.

A water-heating vessel 16 has a pipe connection 17 near its bottom with the bottom of vessel 5 and at its upper end connects, by means of a pipe 18, with an injector 19, which discharges into the pipe 14, and the steam-nozzle 20 of said injector 19 is connected with a steam heating-coil 21 within the vessel 16, which is fed from a valved steam-supply pipe 22. By this arrangement after heating the water contained in the vessel 16 the steam ejecting through the nozzle 19 forces the hot water from vessel 16 in an atomized spray into the pipe 14, where it thoroughly mixes with the disintegrated size, and the thorough mixture of atomized water and disintegrated size and the exhaust-steam pass together with force through the pipe 14 into the water 6, where the completed mixture of the hot size and hot water is readily diluted in the cooler water contained in the vessel 5. As the size mixture has a lighter specific gravity than the water, it will remain uppermost, and the water drawn from the vessel 5 to replace that ejected from vessel 16 will be the clear water from the bottom of the vessel 5.

It is obvious that inasmuch as the heating-coils 10 and 21 only affect a small portion of the size and water, respectively, at one time the heating may be accomplished in much less time and with less expense than if the entire bodies of size and water were required to be brought to the proper temperature for mixing. It is also obvious that the particular construction of the apparatus shown in Fig. 1 and above described is not essential to the proper operation in accordance with the principles of this invention, but that any variations may be made therein without materially departing from the spirit and scope of the invention, and one of such variations is contained in the construction shown in Fig. 2. This construction differs from that above described in that the water vessel 16 is replaced by a vessel receiving its supply of water from a source other than the vessel 5. In this construction a vessel 23 is supplied with water 24 from an outside source and discharges through a valved connection 25 into the pipe 14 without being first atomized, as with the former construction, but relying upon the effect of injector 13 to atomize it on its way to the vessel 5. A steam-coil 27 is provided in the vessel 23 for heating the water 24 to the desired temperature, so that practically the same results are accomplished by this construction as were set forth for the construction above described.

What I claim as my invention is—

1. In a means for dissolving paper-size, a water vessel, a size vessel, a reduced heating-chamber for the size vessel, means in connection with the size vessel for injecting the size forcibly into the water of the water vessel, and means for mixing hot water with the size before it reaches the water vessel.

2. In a means for dissolving paper-size, a water vessel, a size vessel, a reduced heating-chamber for the size vessel, an injector adapted to disintegrate the size which is delivered thereto by the reduced chamber of the size vessel and forcibly inject it into the water vessel, and means for introducing hot water to said disintegrated size before it reaches the water vessel.

3. In a means for dissolving paper-size, a water vessel, a size vessel, means for injecting the size from the size vessel into the water vessel, a water-heating vessel having connection with the water vessel, and means for atomizing the heated water thereof and injecting it into the size before the size reaches the water vessel.

4. In a means for dissolving paper-size, a water vessel, a size vessel, a reduced heating-chamber for the size vessel, means for injecting the heated size from said heating-chamber of the size vessel into the water vessel, a water-heating vessel having connection with the water vessel, and means for atomizing the heated water thereof and injecting it into the size before it reaches the water vessel.

5. In a means for dissolving paper-size, a water vessel, a size vessel, a reduced heating-chamber for the size vessel, an injector adapted to disintegrate and forcibly inject the heated size received thereby from the heating-chamber of the size vessel into the water vessel, a water-heating vessel having connection with the water vessel, and means for atomizing the hot water thereof and forcibly injecting it into the disintegrated size before it reaches the water vessel.

6. In a means for dissolving paper-size, a water vessel, a size vessel, a reduced heating-chamber for the size vessel, a steam heating-coil located therein, an injector receiving size from the heating-chamber of the size vessel and disintegrating and discharging it into the water vessel, said injector having its nozzle connected with the said steam-coil, a water-heating vessel having connection with the water vessel, a steam-coil therein, and an injector for atomizing and discharging the water of the water-heating vessel into the disintegrated size before it reaches the water vessel, the nozzle of said injector being connected with the coil of the water-heating vessel.

7. In a means for dissolving paper-size, a water vessel, a size vessel, a reduced heating-chamber for said size vessel, a steam-coil located in the heating-chamber, an injector receiving size from the heating-chamber and discharging it into the water vessel, the nozzle of said injector being connected with the steam heating-coil, and a water-heating vessel having connection with the injector.

8. In a means for dissolving paper-size, a water vessel, a size vessel having a reduced heating-chamber, and means in connection with the size vessel for injecting the size forcibly into the water of the water vessel and for mixing water therewith before it reaches the water vessel.

9. In a means for dissolving paper-size, a water vessel, a size vessel, means in connection with the size vessel for injecting the size forcibly into the water of the water vessel near the surface thereof, a water-heating vessel having connection with the water vessel near the bottom thereof, and means for atomizing the heated water of the water vessel and injecting it into the size before the size reaches the water of the water vessel.

10. In a means for dissolving paper-size, a water vessel, a size vessel, a reduced heating-chamber for the size vessel, a steam heating-coil located therein, an injector receiving size from the heating-chamber of the size vessel and disintegrating and discharging it into the water of the water vessel near the surface thereof, said injector having its nozzle connected with the said steam-coil, a water-heating vessel having connection with the water vessel near the bottom thereof, a steam-coil therein, and an injector for atomizing and discharging the water of the water-heating vessel into the disintegrated size before it reaches the water vessel, the nozzle of said injector being connected with the steam-coil of the water-heating vessel.

11. In a means for dissolving paper-size, a water vessel, a size vessel, means for heating a comparatively small portion of the water of the water vessel, means for heating a small portion of the size of the size vessel, and means for finely atomizing the heated water and the heated size and mixing them together and then injecting such mixture into the main portion of the water of the water vessel.

In testimony whereof I affix my signature in presence of two witnesses.

BRUNO KNIFFLER.

Witnesses:
R. S. C. CALDWELL,
ANNA F. SCHMIDTBAUER.